3,335,017
PAPER WITH RELEASE COATING AND PROCESS FOR MAKING SAME
Millard C. Spencer, South Portland, Maine, assignor to S. D. Warren Company, Boston, Mass., a corporation of Massachusetts
No Drawing. Filed Mar. 14, 1962, Ser. No. 179,799
9 Claims. (Cl. 117—76)

The present invention relates to coatings for paper and related fibrous products. More specifically, it relates to coatings which are generally classified in the art as release coatings and are characterized by their ability to release intact from a surface that normally tends to adhere.

The field of release coatings is wide. They have been used to coat packaging material for such tacky products as asphalt. They act as supports and finishing surfaces for organic film material. Another important use of such coatings is in press release papers. Although the present invention is applicable to these other various uses, it is more specifically aimed at providing a new and improved press release paper.

Briefly described, a press release paper is one that is subjected to heat and pressure between two surfaces such as metal platens. The coated surface of the release paper is in direct contact with a moldable, fusible type material (e.g. vinyl film, vinyl crumb compositions, etc.). The release paper provides not only a surface against which these materials may form and from which they will readily release, but the quality of the release surface in regard to finish (e.g. gloss, dullness) determines the finish of the material formed against it.

Considering the treatment to which a release paper is subjected, it is obvious that many factors must be satisfied to produce a satisfactory release paper. It must be able to withstand heat and pressure and it must be capable of providing diverse finishes from its own surface. Most importantly the release coat itself must remain a continuous tight layer, for the slightest breakdown or pitting of this surface will permit penetration and consequent adherence of the material molded against it.

The release coatings of my invention make use of silicone compounds. The use of silicone products has been practiced in the art but they have heretofore been used in the form of solutions in organic solvents or aqueous emulsions. My invention utilizes aqueous solutions of silicone compounds. In addition to improved release performance, the aqueous silicone solutions provide a number of beneficial advantages over the organic solvent solutions and aqueous emulsion. Economically, the aqueous solutions are readily available at costs well below those of the organic solvent and aqueous emulsion systems. This advantage is further amplified by the fact that costly catalysts, necessary to initiate polymerization in organic solvent and aqueous emulsion systems, are eliminated in my aqueous solution system where polymerization is initiated merely by elevated temperatures and exposure to air.

Safety is another factor to be considered. Those familiar with the industrial use of organic solvents realize the safety problems involved with regard to personnel and equipment. These hazardous conditions are not present with my aqueous system.

Furthermore, under average and closely related conditions of temperature and humidity, the aqueous solutions I use are stable over extended periods of time displaying only a slight tendency to evaporate, settle out, or skin over. This can be especially appreciated when a coating operation is in progress and it is necessary to shut down for an indeterminate period of time. In such a case the aqueous solution can safely remain on the coater. There is no time loss in cleaning up and subsequently replenishing the coater.

Paper coated with such aqueous solutions is capable of satisfying the requirements of a good press release paper, and capable of servicing a wide range of products such as plastisols, organisols, film forming compositions and resin impregnated papers.

It is an object of this invention to provide a release paper having a silicone coating applied from an aqueous solution.

It is another object of this invention to utilize a highly alkaline aqueous silicone solution as a release coating.

It is another object of this invention to provide from aqueous solution, a release coating that will work with plastisols, organisols, films and resin impregnated papers such as those impregnated with diallyl phthalate.

Furthermore it is an object of this invention to provide a release paper having on its surface the decomposition product or evaporation residue of highly water-soluble, alkali metal alkyl siliconates.

According to the present invention a suitable base (e.g. paper) is coated with a diluted, highly alkaline aqueous solution of a siliconate. The siliconate may be used alone, but preferably it is mixed with a hydrophilic film former such as polyvinyl alcohol, carboxymethyl cellulose, starch or the like. The coated sheets are dried and further cured at elevated temperatures to completely insolubilize the silicone compound.

The useable siliconates comprise the highly water-soluble, alkali-metal alkyl siliconates. Representative of the alkali metals are sodium, potassium and lithium, while suitable alkyl groups are methyl and ethyl. Some commercial examples are as follows:

Dow Corning 771 and 772: Aqueous solutions of sodium siliconates.
General Electric SC–50: Aqueous solution of the monosodium salt of methyl siliconic acid.
Union Carbide R–20: Aqueous solution of the monosodium salt of methyl siliconic acid.

These compounds are known commercially as water-repellent coatings for concrete, brick and other masonary surfaces. Their use, however, as release coatings on paper has not hitherto been suggested, possibly because of the highly alkaline nature of the compounds. I have found, however, that their high alkalinity is not objectionable for this purpose.

In practice, these siliconate solutions are applied to a suitable paper bodystock. The bodystock is preferably one which has already been base-coated to prevent penetration of the release coating into said bodystock. The said base coat may be a layer of mineral filler and adhesive such as casein or starch, or it may be an unpigmented continuous film of polyvinyl alcohol, carboxymethyl cellulose, or the like.

To insure continuity in the release coat deposited from the aqueous siliconate solution it is preferable to include in said solution a film former such as polyvinyl alcohol, carboxymethyl cellulose, or the like. The coating may be applied, by any of the known coating methods, as a dilute aqueous solution having a pH value in a range of approximately 10–13. The coating of siliconate with or without film former is dried to eliminate water and is further heated to cure and insolubilize the silicone compound.

Curing is dependent upon time and temperature and can extend over an extremely wide range from a long time period at a low temperature to a fraction of a second at a high temperature. A suitable temperature and time for laboratory use is 375° F. for 2 minutes or more. Curing may be effected at a temperature as low as 250° F. for about 10 minutes but this is considered to be impractical for either laboratory or mill use. A temperature of 300°

F. for 6 minutes may be used but a temperature of 375° F. for 2 minutes is preferred for laboratory use. For mill use a temperature of 600° F. for 12 seconds is considered to be practical.

It is believed that as a result of the drying and curing operation, the siliconate may react with the carbon dioxide in the atmosphere so that (1) the alkali is neutralized, and (2) a silanol is formed which further condenses to form a siloxane which is present as a cyclic, linear or cross-linked polymer or mixture thereof.

Such polymer decomposition products or evaporation residues are tough, water-insoluble, water-repellent resins providing excellent release surfaces.

The invention is illustrated by the following specific examples.

*Example 1*

A paper web having a basis weight of 135 grams per square meter was made from selected wood fibers and used as bodystock. A base coat of the following composition was applied to this paper web.

| | Parts by wt., dry |
|---|---|
| Clay | 100 |
| Tetrasodium pyrophosphate (to disperse clay) | 1 |
| Casein dispersed by ammonia | 12 |
| Styrene-butadiene copolymer latex (added as 48% solids latex) | 12 |
| Water to make solids content 42%. | |

The web was coated on both sides by means of a smoothing roll coater, dried and calendered. The dry coating weight was 15 grams per square meter per side.

To one side of this base-coated web a release top-coat of the following composition was applied:

| | Parts by wt., dry |
|---|---|
| Dow-Corning 772 (added as a 30% aqueous solution of a sodium siliconate) | 15.0 |
| Polyvinyl alcohol (added as a 10% solution) | 22.5 |
| Triton X-100 (wetting agent—a non-ionic alkylaryl polyester alcohol sulfonate) | 1.0 |
| AHCO 69 (defoamer—a mixture of aliphatic hydrocarbons and fatty glycerides) | 0.5 |
| Water to make solids content 11%. | |

This top coat composition was applied by means of an air-knife coater so that a total of 5.25 grams per square meter of dry coating was obtained. The resultant web was dried at 280° F. for three minutes and then cured at 375° F. for two minutes and supercalendered to a glossy finish.

The web of Example 1 was used in the bonding of thermoplastic polyester film to plywood. The film was placed on a sheet of plywood, and on top of the film was placed the release paper with its top-coat surface in contact with the film. This sandwich was placed between two press platens at a temperature about 320° F., and subjected to a pressure of about 225 pounds per square inch for 45 seconds. Upon removal of the sandwich from the press, the release paper easily stripped off revealing the permanent smooth bonding of the polyester film to the plyboard. The polyester film had the finish of the release paper.

*Example 2*

The 135 grams per square meter bodystock of Example 1 was coated on one side by means of an air knife coater with a barrier coating of the following composition:

| | Parts by wt., dry |
|---|---|
| Polyvinyl alcohol (fully hydrolyzed) | 100 |
| Butanol (as a wetting agent) | 1 |
| Water to establish coating solids at 10%. | |

The resultant web on drying had a coating weight of 3 grams per square meter. This web was further top-coated on its coated side by means of an air knife coater with the release composition of Example 1, the dry weight of coating being 4.9 grams per square meter. After drying at 275° F. for three minutes, and curing at 375° F. for two minutes, this web was lightly calendered to a semi-gloss finish.

In a manner similar to that of Example 1, a thermosetting diallyl phthalate resin-impregnated sheet was placed in contact with a plyboard panel. The release side of the paper was placed in contact with the resin-impregnated sheet. This sandwich was placed between the metal platens with heat and pressure conditions applied as in Example 1. The dwell time in the press however was ten minutes.

Upon removal of this sandwich from the press, the release paper easily stripped off, producing a panel with a smooth, well bonded resin surface having the finish of the release paper.

*Example 3*

A 135 grams per square meter basis weight bodystock was coated on both sides by means of a smoothing roll coater with the base-coat composition of Example 1. The dry coating weight was 15 grams per square meter per side. This web was further coated on one side by means of an air-knife coater with the polyvinyl alcohol barrier coating of Example 2. The dry barrier coating weight was 5 grams per square meter.

To this web on the barrier coated side, by means of an air-knife coater, a release coat of the following composition was applied:

| | Parts by wt., dry |
|---|---|
| General Electric's SC-50 (added as a 30% aqueous solution of the monosodium salt of methyl siliconic acid) | 15 |
| Polyvinyl alcohol | 22.5 |
| Triton X-100 (a non-ionic alkylaryl polyester alcohol sulfonate wetting agent) | 1.0 |
| AHCO 69 Defoamer (a mixture of aliphatic hydrocarbons and fatty glycerides) | 0.5 |
| Water to make solids content 12%. | |

A dry coating weight of 4.5 grams per square meter was applied. This web was dried and cured in the same manner as those of the preceding examples, and then calendered lightly to a semi-gloss finish.

A plyboard-vinyl film-release paper sandwich was set up and placed between press platens. The temperature was 320° F., the pressure was 250 pounds per square inch and the dwell time was thirty minutes. Upon removal from the press, the release paper easily stripped off revealing the vinyl film well bonded to the plyboard, its surface having the finish of the release paper.

*Example 4*

Bodystock having a basis weight of 90 grams per square meter was based-coated on both sides by means of a squeeze roll coater with the following composition:

| | Parts by wt., dry |
|---|---|
| Clay (coating grade) | 100 |
| Starch | 200 |
| Dimethylol urea | 2 |
| Spermaceti (emulsified) | 2 |
| Water to make solids content 13%. | |

The amount of coating composition applied was 1.5 grams per square meter per side. To one side of this base-coated bodystock, a top-coat of the following composition was applied by means of an air-knife coater:

| | Parts by wt., dry |
|---|---|
| Union Carbide R-20 (added as a 30% aqueous solution of the mono sodium salt of methyl siliconic acid) | 15 |
| Polyvinyl alcohol | 22.5 |
| Triton X-100 (a non-ionic alkylaryl polyether alcohol sulfonate wetting agent) | 1.0 |
| AHCO 69 Defoamer (a mixture of aliphatic hydrocarbons and fatty glycerides) | 0.5 |
| Water to make solids content 10%. | |

This coated web was dried and cured as in the preceding examples resulting in a web having a dry top-coat weight of 6 grams per square meter.

To the active release side of this web, a vinyl plastisol composition was applied by means of a doctor knife, the thickness of the plastisol layer being approximately 8 mils in thickness. The product was semi-fused at 100° C. for one minute and then fused at 190° C. for two minutes. The paper was then easily stripped from the vinyl film product which had a matte finish.

In the foregoing example the top coating may be simply dried sufficiently to eliminate water without subsequent curing by heat and will nevertheless have sufficient releasing qualities for use when, as in this example, pressure is not applied to the film to be released therefrom.

*Example 5*

Bodystock having a 90 grams per square meter basis weight was casein coated on both sides by means of a squeeze roll coater with the following composition:

| | Parts by wt., dry |
|---|---|
| Clay | 100 |
| Casein dispersed by ammonia | 200 |
| Spermaceti (emulsified) | 0.5 |
| Ketene dimer size | 14 |
| Defoamer | 2.5 |

Water to bring solids content to 14%.

The web was coated with an amount of 1.5 grams per square meter per side.

The base coated web thus treated was then top-coated on one side by means of an air-knife with the following composition:

| | Parts by wt., dry |
|---|---|
| Starch | 15 |
| General Electric SC–50 (added as a 30% aqueous solution of the monosodium salt of methyl siliconic acid) | 20 |
| Triton X–100 (a non-ionic alkylaryl polyether alcohol sulfonate wetting agent) | 1 |

Water to make solids content 11%.

The dry coating weight applied to the web was 3.75 grams per square meter. This web was dried and cured in the manner of the preceding examples.

A plyboard-vinyl film-release paper sandwich was prepared and placed between press platens. The temperature was 340° F., the pressure was 250 pounds per square inch and the dwell time was thirty minutes. Upon removal from the press, the release paper easily stripped off revealing the vinyl film well bonded to the plywood and having a matte finish.

*Example 6*

A 135 grams per square meter bodystock was coated on one side by means of a transfer roll coater with the base-coat composition of Example 1. The dry coating weight was 15 grams per square meter. The web was further dried and calendered.

The web thus treated was again coated on its coated side by means of an air-knife coater, with the following composition:

| | Parts by wt., dry |
|---|---|
| Casein dispersed by ammonia | 14.5 |
| General Electric SC–50 (added as a 30% aqueous solution of the monosodium salt of methyl siliconic acid) | 20 |
| Triton X–100 (a non-ionic alkylaryl polyether alcohol sulfonate wetting agent) | 1.0 |

Water to make solids content 11.5%.

The dry coating weight applied to the web was 4.5 grams per square meter. The web was further dried and cured in the manner of the preceding examples and then calendered lightly to a semi-gloss finish.

A vinyl plastisol composition was applied to the active release side of this web by means of a doctor knife. The wet film was approximately 8 mils in thickness. The product was dried at 100° C. for one minute and cured at 190° C. for two minutes. The release paper was then easily stripped from the vinyl film product which had the semi-gloss finish of the release paper.

In the foregoing exambple the top coating may be simply dried sufficiently to eliminate water without subsequent curing by heat and will nevertheless have sufficient releasing qualities for use when, as in this example, pressure is not applied to the film to be released therefrom.

*Example 7*

A 135 grams per square meter bodystock was coated on one side by means of a transfer roll coater with the base coat composition of Example 1. The dry coating weight was 16 grams per square meter. The web was further calendered and dried.

To the coated side of this web was applied by means of an air-knife coater a barrier coating according to the formulation of Example 2. The dry weight of the barrier coat was 4.5 grams per square meter.

This web was further top-coated by means of an air-knife coater on its barrier coated side with the following composition:

| | Parts by wt., dry |
|---|---|
| Carboxymethyl cellulose | 10 |
| General Electric SC–50 (added as a 30% aqueous solution of the monosodium salt of methyl siliconic acid) | 20 |
| Triton X–100 (a non-ionic alkylaryl polyether alcohol sulfonate wetting agent) | 1 |

Water to make solids content 11.6%.

A dry coating weight of 2.3 grams per square meter was applied. The web was further dried and cured in the manner of the preceding examples and lightly calendered to a semi-gloss finish.

A release paper—diallyl phthalate resin impregnated sheet—plyboard panel sandwich was formed and placed between press platens. The release side of the sheet was in contact with the resin-impregnated sheet. The temperature of the platens was 320° F., the pressure was 225 pounds per square inch and the dwell time was 10 minutes. Upon removal of the sandwich from the press, the release paper easily stripped off, producing a panel with a smooth well bonded resin surface having the finish of the release paper.

*Example 8*

A 135 grams per square meter bodystock was coated on both sides by means of a smoothing roll coater with the base coat composition of Example 1. The dry coating weight was 15 grams per square meter per side. The web was further dried and calendered.

The web was then coated on one side by means of an air-knife coater with the barrier coating composition of Example 2. A dry coating weight of 4.5 grams per square meter was applied.

To the barrier-coated side of the web so produced a release top-coat of the following composition was applied by means of an air-knife coater

| | Parts by wt., dry |
|---|---|
| General Electric SC–50 (added as a 30% aqueous solution of the monosodium salt of methyl siliconic acid) | 20 |
| Triton X–100 (a non-ionic alkylaryl polyether alcohol sulfonate wetting agent) | 1 |

Water to make solids content 7.6%.

The dry coating weight applied was 3.75 grams per square meter.

The web was further dried and cured in the manner of the preceding examples and calendered lightly to a semi-gloss finish.

A sandwich was formed, comprising a layer of vinyl crumb composition approximately 3/16" thick on a square of the release paper covered by a square of felt backing such as that used for plastic floor coverings. This sandwich was placed between the press platens at a temperature of 320° F., and no pressure for one minute to soften the vinyl crumbs. After this time, pressure of 1,000 pounds per square inch was applied for 15 seconds and the sandwich removed. The release paper easily stripped off producing a smooth, well bonded vinyl tile composition having the semi-gloss finish of the release paper.

*Example 9*

A paper web having a basis weight of 90 grams per square meter was base coated on both sides by means of a transfer roll coater with the following composition:

| | Parts by wt., dry |
|---|---|
| Clay | 75 |
| Calcium carbonate | 20 |
| Titanium dioxide | 5 |
| Soybean protein (dispersed by ammonia) | 18 |
| Tetrasodium pyrophosphate (to disperse clay) | 0.2 |
| Styrene-butadiene copolymer | 4 |
| Urea | 5 |
| AHCO 69 (defoamer—a mixture of aliphatic hydrocarbons and fatty glycerides) | 1.5 |
| Parez 613 (Melamine-formaldehyde resin) | 1.0 |
| Soap | 0.5 |

Water to make solids content 42%.

After coating, the web was dried and embossed. The weight of the dry coating was 15 grams per square meter per side.

The web was further top coated on one side with the release coat composition of Example 1. The coating was applied by means of an air knife. The resultant web was dried at 275° F. for three minutes and cured at 380° F. for two minutes. The dry coating weight was 5 grams per square meter.

The web so prepared was used in the production of a durable attractive phenolic resin composition. A sandwich was formed of the following layers, starting with the bottom layer and working upwards:

1 sheet of release paper (release surface facing the overlying sheet)
1 overlay sheet of alpha cellulose impregnated with melamine-formaldehyde resin
1 decorative sheet impregnated with melamine formaldehyde resin
12 sheets of kraft impregnated with phenolic resin
1 sheet of release paper (release surface facing the underlying sheet)

This sandwich was placed between the press platens at a temperature of 290° F., and a pressure of 1,000 pounds per square inch for eleven minutes. Upon removal of the sandwich from the press, the release paper easily stripped off revealing the well bonded durable resin composition having the embossed finish of the release paper.

From the foregoing description and examples, it can be seen that my invention provides a simple and inexpensive process for preparing release papers. Furthermore these release papers are characterized by a broad range of application to industrial uses.

Although the invention has been found to be workable without employing film formers such as polyvinyl alcohol or carboxymethyl cellulose, the presence of such hydrophilic colloids in the release coat strengthens its resistance to penetration and increases subsequent re-use of the release paper. I have found that optimum results are obtained when the dry weight of film former is in the range of 1 to 3 times the dry weight of the silicon compound.

I have also found it advantageous in regard to storage life and durability, to apply to the selected bodystock, a surface-size or coating prior to application of the release coating. In the preceding examples, I have mentioned but a few of the many conventional paper sizes and coatings used in the paper industry. Obviously other equivalent paper sizes and coatings can be used equally as well.

I claim:

1. A release paper comprising a fibrous base and bearing on at least one surface thereof an insoluble, continuous top coating comprising the evaporation residue of an aqueous solution of hydrophilic colloid and the decomposition products of an alkali metal alkyl siliconate heat-cured at at least 250° F., said coating being easily separable from hot and cold thermoplastic and thermosetting resinous materials.

2. A release paper according to claim 1 in which the alkali metal alkyl siliconate of said coating is a sodium alkyl siliconate.

3. A release paper according to claim 1 in which the alkali metal akyl siliconate of said coating is an alkali metal methyl siliconate.

4. The product of claim 1 having a base coat containing hydrophilic colloid located between said fibrous base and said top coating.

5. The product of claim 1 having a base coat containing hydrophilic colloid and mineral material located between said fibrous base and said top coating.

6. The process which comprises applying to a flexible fibrous base a top coating of a composition of an alkaline aqueous solution of a water-soluble alkali metal alkyl siliconate and a hydrophilic film former, heating the resulting coated base to a temperature of at least 250° F. and for a time sufficient to remove the water content thereof and further heating said coated base at a temperature and for a time sufficient to make said top coating water-insoluble with a continuous surface having good release properties.

7. The process as defined in claim 6 in which the elevated temperature is within the range from 300° F. to 600° F. and the time is within the range from a few seconds to at least 6 minutes.

8. The process according to claim 6 in which the alkalinity of said composition is in the pH range of 10–13.

9. The process according to claim 6 wherein the amount of hydrophilic film former in said composition is up to 3 times the weight of alkali metal alkyl siliconate.

References Cited

UNITED STATES PATENTS

| 2,507,200 | 5/1950 | Elliott et al. | 117—121 |
| 2,739,910 | 3/1956 | McGawey | 117—161 |
| 2,970,932 | 2/1961 | Edlund | 117—45 |

WILLIAM D. MARTIN, *Primary Examiner.*

RICHARD D. NEVIUS, *Examiner*

H. W. MYLIUS, *Assistant Examiner.*